(12) United States Patent
Flatau

(10) Patent No.: US 7,266,281 B1
(45) Date of Patent: Sep. 4, 2007

(54) OPTICAL FIBER PATCH BOX

(76) Inventor: Joseph G. Flatau, P.O. Box 325, Elkton, MD (US) 21922

( * ) Notice: Subject to any disclaimer, the term of this patent is extended or adjusted under 35 U.S.C. 154(b) by 0 days.

(21) Appl. No.: 11/483,027

(22) Filed: Jul. 7, 2006

Related U.S. Application Data

(60) Provisional application No. 60/697,239, filed on Jul. 7, 2005.

(51) Int. Cl.
G02B 6/00 (2006.01)
(52) U.S. Cl. ........................ 385/135; 385/53; 385/136; 385/137
(58) Field of Classification Search ................ 385/53, 385/54, 55, 56, 134, 135, 136, 137, 138, 385/139, 88, 92
See application file for complete search history.

(56) References Cited

U.S. PATENT DOCUMENTS

| | | | | |
|---|---|---|---|---|
| 5,127,082 A | * | 6/1992 | Below et al. ................ 385/135 |
| 5,167,001 A | * | 11/1992 | Debortoli et al. ........... 385/135 |
| 5,204,929 A | * | 4/1993 | Machall et al. ............. 385/135 |
| 5,224,199 A | | 6/1993 | Cortijo ....................... 385/135 |
| 5,412,751 A | | 5/1995 | Siemon et al. .............. 385/135 |
| 5,461,690 A | | 10/1995 | Lampert ..................... 385/100 |
| 5,683,005 A | | 11/1997 | Mordick ...................... 220/3.7 |
| 5,781,681 A | | 7/1998 | Manning ....................... 385/86 |
| 5,892,870 A | | 4/1999 | Fingler et al. ................ 385/59 |
| 5,904,592 A | * | 5/1999 | Baran et al. ................ 439/532 |
| 5,915,656 A | | 6/1999 | Grewe ......................... 248/150 |
| 5,971,623 A | | 10/1999 | Wanamaker ................. 385/53 |
| 6,167,183 A | | 12/2000 | Swain ......................... 385/135 |
| 6,208,796 B1 | * | 3/2001 | Williams Vigliaturo ..... 385/135 |
| 6,360,050 B1 | * | 3/2002 | Moua et al. ................. 385/135 |
| 6,435,727 B1 | | 8/2002 | Fingler et al. ................ 385/53 |
| 6,439,779 B1 | | 8/2002 | Hafer .......................... 385/76 |
| 6,484,997 B1 | | 11/2002 | Edwards et al. ............ 248/906 |
| 6,496,642 B2 | | 12/2002 | Gonzalez et al. ........... 385/136 |
| 6,672,774 B2 | | 1/2004 | Theuerkorn et al. .......... 385/86 |
| 6,705,356 B2 | | 3/2004 | Barton et al. ................... 141/2 |
| 2002/0009278 A1 | | 1/2002 | Fingler et al. .............. 385/135 |
| 2004/0156582 A1 | | 8/2004 | Fingler et al. ................ 385/24 |
| 2005/0029409 A1 | | 2/2005 | Tagle ........................ 248/27.1 |

OTHER PUBLICATIONS

One Panel Wall Termination Enclosure; http://www.l-com.com/item.aspx?id=5667; by L-com, Inc. of North Andover, MA published on or before May 22, 2006.

* cited by examiner

*Primary Examiner*—Brian M. Healy
(74) *Attorney, Agent, or Firm*—Law Offices of Donald Cox, LLC

(57) ABSTRACT

A patch box including a housing in which the housing has a rail-mounting latch. An optical fiber assembly mounted within the housing wherein the housing has connectors mounted thereon. The optical fiber assembly connects between at least two of the connectors.

20 Claims, 10 Drawing Sheets

OPTICAL FIBER PATCH BOX

CROSS-REFERENCE TO RELATED APPLICATION(S)

This application claims the benefit of U.S. Provisional Application Ser. No. 60/697,239 filed on Jul. 7, 2005, which is incorporated herein by reference.

BACKGROUND OF THE INVENTION

1. Field of the Invention

This invention relates generally to optical fibers, and, more particularly, to an optical fiber patch box.

2. Description of the Related Art

With the advent of digital signal communications, optical fiber systems are evolving to meet demand including improved cable designs and reduced operating costs. Thus, more and more, data communication systems traditionally serviced by copper wire connections for digital and analog signaling are being replaced by systems using fiber optic cables. Fiber optic connections are no longer used solely for proprietary telecommunication lines and circuits and are being used in many other industries and applications.

One drawback to all of this growth is that the applications and uses for fiber optic systems have outpaced system designs for all of these new system configurations. One such area is in the use of fiber optic systems in the area of industrial feedback and control systems in which peripheral devices such as, sensors and operative switches and other devices, now communicate with control devices through fiber optic connections. The controllers, having optic, electrical or electro-optic circuitry, are maintained in a housing or cabinet. Presently, the connection of these systems is made through the use of a conventional patch panel developed for the telecommunications industry. While fit for its originally intended purpose in the telecommunications field, the patch panel allows for fibers to be spliced and connected together thereby providing a connection for the digital signals to pass there through. A patch panel connection usually requires a dust free environment and the preparation of fiber optic ends with a sufficiently precise end surface to ensure that TIR (Total Internal Reflection) of the optic signal is maintained when two fibers are connected together. The conventional patch panel has drawbacks in the industrial field where the environment does not necessarily have the same generally clean environment used by the telecommunications industry. Additionally, patch panels are usually intended to be rack mounted while most industrial housings are configured for rail-mounted components. Furthermore, the preparation of the fiber optic cable usually requires a specially trained technician to splice the optical fibers into the patch panel.

When a fiber optic cable breaks during normal use, the technician must be called out to replace the cable in the patch panel. For operations and businesses where such occurrences are rare, the cost of keeping a technician on site is cost prohibitive; however, when a brake occurs there can be a considerable down time associated with the break as a technician must be called in to replace the cable.

One solution to this problem has been the development of a pre-terminated patch panel with a non-removable ribbon cable input lead; however, these pre-terminated patch panel designs have been developed for wide range of applications. While fit for many general applications, such pre-terminated patch panels have limitations in the industrial control systems industry. One issue is the use of non-removable ribbon cable to connect with outside lines. Such non-removable cable, while providing an extension to the patch panel when needed for replacing existing patch panel rack configurations that can use a larger footprint, are not desired in the cramped space of a controller cabinet. The ribbon cable must often be threaded around other cables and components in the cabinet in a manner that maintains the minimum bend radius of the cable. Moving or adding components may result in movement leading to breakage, or actual breakage of, the ribbon cable requiring replacement of the entire pre-terminated patch panel. Furthermore, such devices are not configured for cabinets that use rail mounting of components and require that special mounting brackets be installed in the cabinet, often away from other components. Such configurations result in wasted or lost space within the cabinet.

Thus, the need exists for a way to provide a pre-terminated patch panel that retains all of the design benefits for ease of installation and durability while correcting the problems with installation in cabinets that have been identified above.

SUMMARY OF THE INVENTION

The invention relates to a patch box including a housing in which the housing has a rail-mounting latch. An optical fiber assembly is mounted within the housing wherein the housing has connectors mounted thereon. The optical fiber assembly connects between at least two of the connectors.

In one embodiment, the optical fiber assembly includes a mounting device in the form of adhesive tape.

The optical fiber assembly is mounted in the housing by a mounting device which may include tape, glue, brackets or foam.

The optical fiber assembly is arranged in the housing to maintain TIR between said at least two connectors and is in a generally dust free environment within said housing.

The invention further relates to a DIN rail cabinet and patch box assembly including a cabinet housing having at least one DIN rail mounted therein. At least one of the patch boxes is included in the cabinet housing. At least one outgoing fiber cable is releasably connected to one of the patch box connectors. At least one DIN rail mountable device mounted to the at least one DIN rail and connected via an optical cable to another one of the patch box connectors to form a signal communication link between the outgoing cable and the DIN rail mountable device.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

Figure 1A:
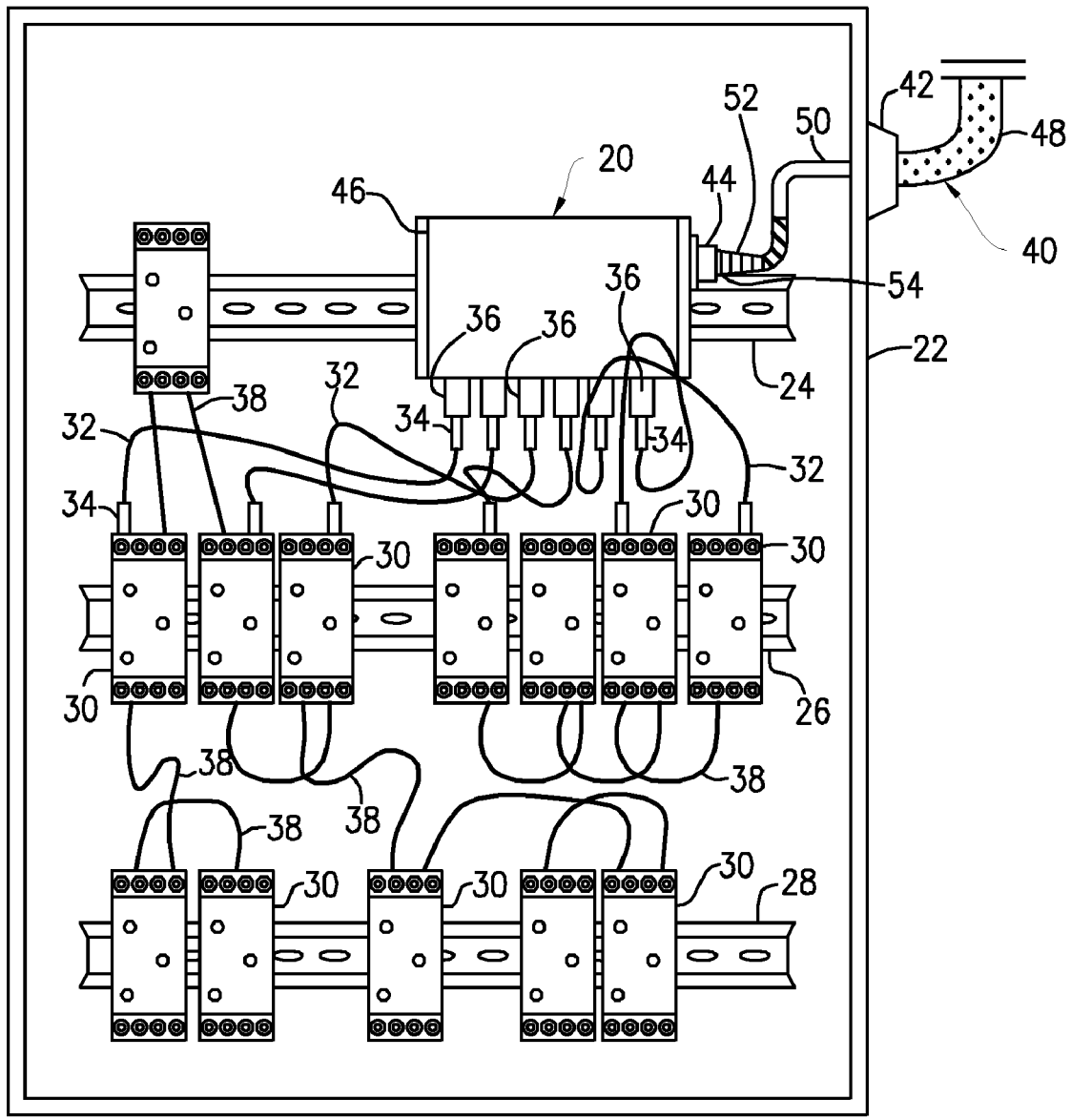
FIG. 1A is a front view of an industrial cabinet incorporating a patch box according to the present invention.

With reference to the drawings for purposes of illustration, a patch box 20 is illustrated in FIG. 1A in an industrial cabinet 22 configured with rails 24, 26 and 28 for the rail mounting of feedback and control equipment 30 in which fiber optic cables 32 pre-terminated with distribution plugs or connectors 34 connect between the patch box connectors 36 and the equipment 30. The equipment 30 is also interconnected by cables that may include fiber optic or electrical cables 38 which may be pre-terminated with connectors or terminated on-site to each piece of equipment 30. Such cable configurations for the cables 38 may vary according to the specification of the equipment or requirements of the application. A pre-terminated cable 40 having a bundle of optical fibers enters the cabinet through a cable port 42 and plugs into the patch box at an outgoing cable connector 44.

Advantageously, the patch box is mounted on a rail within the cabinet and provides connectors for connecting all of the optical fibers in the circuit. All of the optical fibers connect to the patch box at a connector mounted on the housing 46 of the patch box. Thus, should any fiber cables 32 become broken or damaged, they can easily be replaced without the need to replace the patch box 20.

The cable 40, connected to the outgoing cable connector 44, is illustrated in a preferred configuration for industrial use in which the cable includes an exterior portion 48 having outdoor insulation for use exterior of the cabinet 22 and an interior portion 50 having ribbon cable insulation with a strain relief boot 52 surrounding the ribbon cable insulation tapered away from the plug-terminated end 54 of the cable that connects to the patch box. In instances where it is not convenient to locate the patch box near the cable 40, an extension cable (not shown) maybe added to extend between the outgoing cable connector 44 and the cable 40. Furthermore, it is noted that the terms "outgoing" and "distribution" as used in this application to distinguish between the connectors on the patch box are for purposes of illustration only and should not be interpreted as limiting the use of the connector or direction of the signals.

The equipment 30 included in the cabinet can vary from application to application and is really specific to each application. Typical equipment can include, but is not limited to, PLCs (Programmable Logic Controllers), optical modems and Ethernet converters, DCSs (Distributed Control Systems), Servo drives, AC drives, Chart Recorders, Pneumatic Controllers, and Power Conditioning devices. Applications for the cabinets can include, but are not limited to, HVAC (Heating Ventilation and Air Conditioning) systems, Hydraulic Pump Motor controllers, Traffic Control Systems, Security Systems, and Ethernet Networks.

Figure 1B:
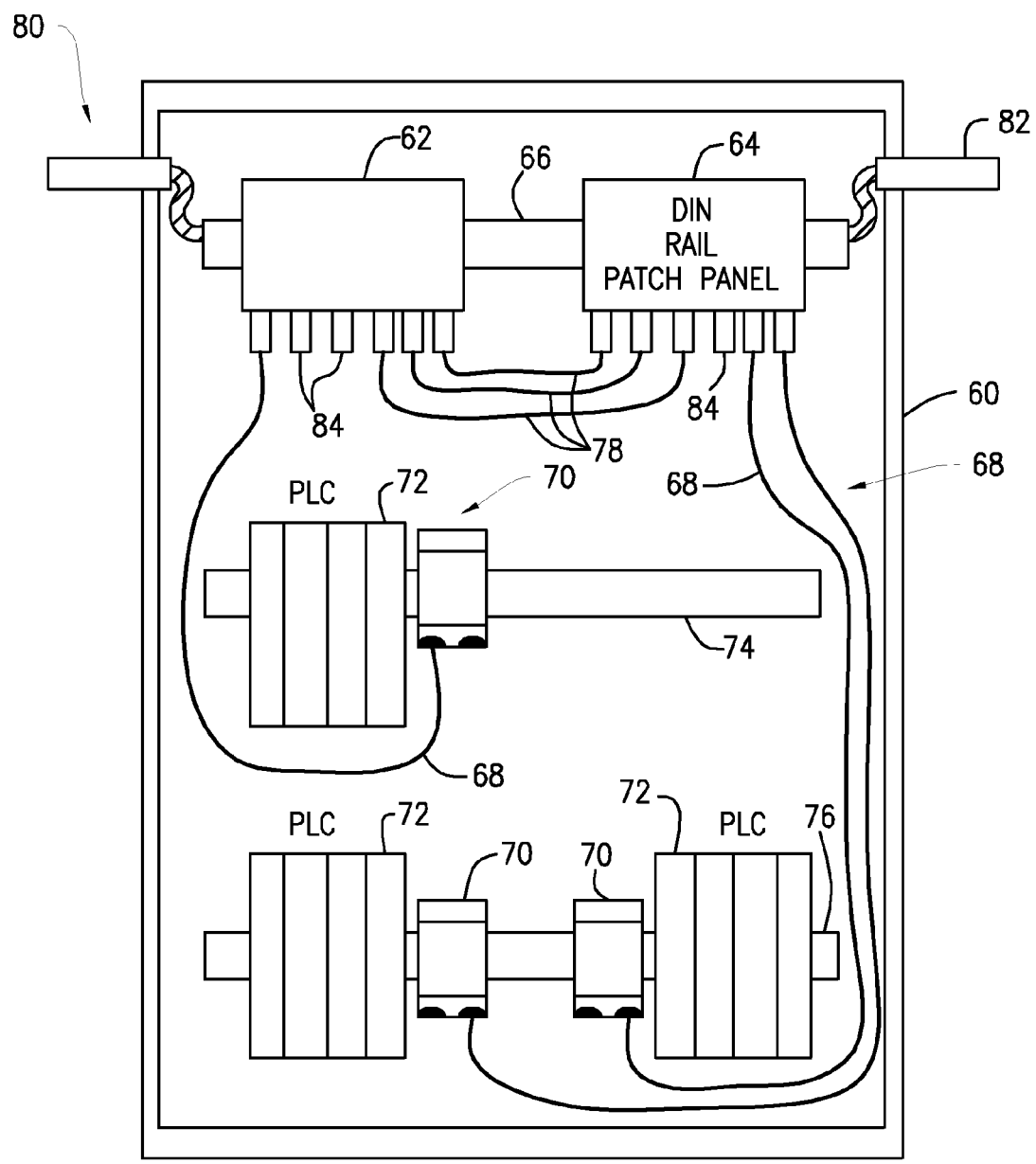
FIG. 1B is an alternate front view of an industrial cabinet incorporating two patch boxes according to the present invention.

An alternate cabinet 60 (FIG. 1B) is configured as for example a substation in which two patch boxes 62 and 64 are mounted on a rail 66 within the cabinet 60 in which some optical fiber leads 68 pass to optical modem 70 and PLC 72 assemblies mounted on rails 74 and 76. While other cable leads 78 cause fiber optic connections to pass directly through the cabinet 60 through fiber optic connections that pass directly through the two patch boxes 62 and 64 to respective outer optical fiber cables 80 and 82. It will be appreciated by those skilled in the art that rail mounted patch boxes facilitate changes in the cabinet configuration and wiring. Note that some of the connectors 84 of the patch boxes are not used. These fiber optic connections 84 can be reserved for later expansion or held in reserve for testing as needed. Preferably when not in use the connectors are covered with a cover (not shown) to prevent dust and moisture from entering within the connector.

A side view of currently preferred patch box 100 (FIG. 2) includes a plurality of distribution connectors 102-107. As presently shown for purposes of illustration, six distribution connectors or plugs are mounted on the housing with the outgoing connector 108 located in spaced apart relation for easy identification. Each of the distribution connectors 102-107 may include one or multiple optical fibers within each connector. In a typically preferred embodiment, each connector is configured as duplex connector. Thus, each fiber optic cable that connects to the distribution connectors has two optical fibers running through the cable. It should be noted that the cables are preferably conventional commercial-off-the-shelf cables that can be ordered from any fiber optic distributor. The connectors are preferably conventional connectors or male-to-female plug configurations. The plugs are also preferably of the locking type to ensure a dust free connection is maintained. A distribution connector of the suitable for this purpose is the LC connector type manufactured by Corning Cable Systems of Hickory, N.C.

Figure 2:
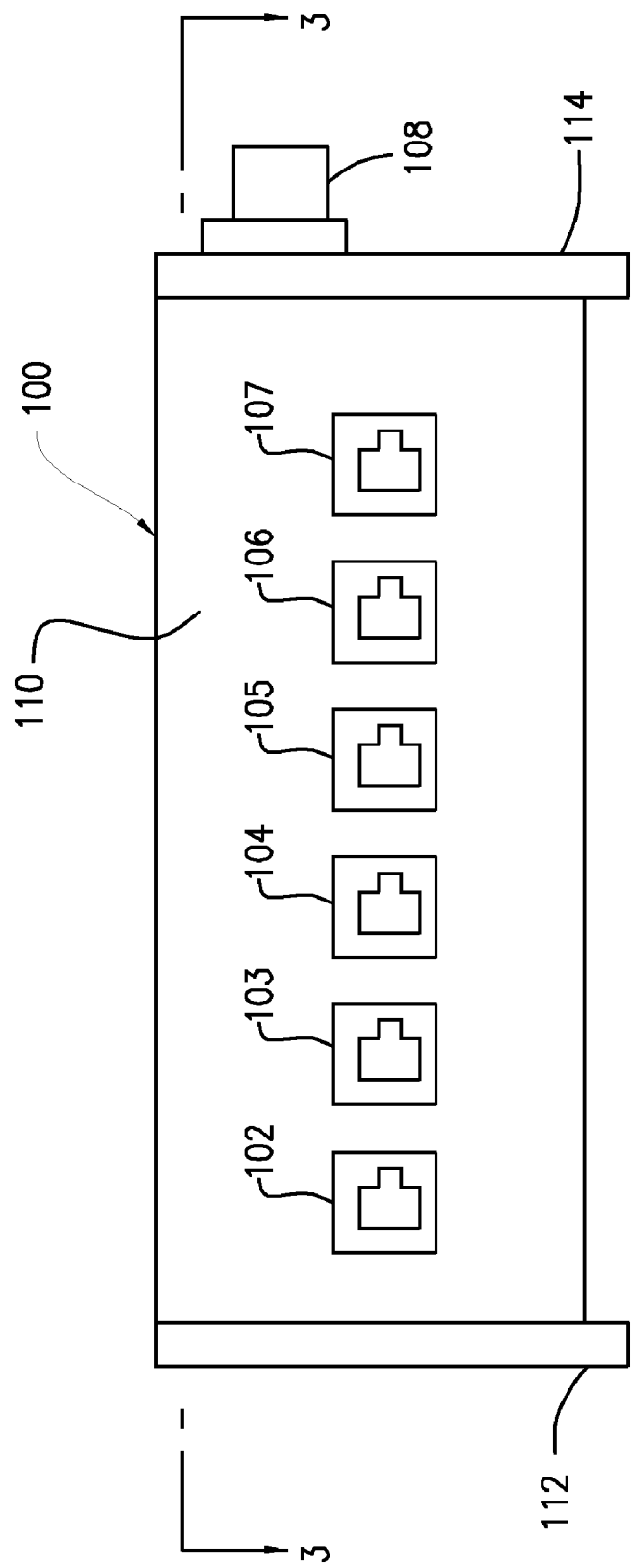
FIG. 2 is a side view of a patch box according to the present invention.

With continued reference to FIGS. 1A and 2, the patch box is sized and shaped to according to criteria including compactness for installation along the mounting rail of the cabinet, cost and availability of housing parts and dimensions sufficient maintain an optimal bend radius for fibers extending between the outgoing connector and the distribution connectors within the patch box. The currently preferred configuration of the patch box is based off of these factors; however, changes in the availability and cost of parts as well as changes in the cabinet design and optical fiber manufacture may result in smaller more compact housings. The presently preferred housing 140 (FIG. 2) is constructed from either an extruded aluminum, folded sheet metal or extruded or injection molded plastic. Such materials are conventionally available for communications equipment housings. End caps 112 and 114 are attached by screws 116 (FIGS. 4A and 4B) to enclose the housing.

Figure 3A:
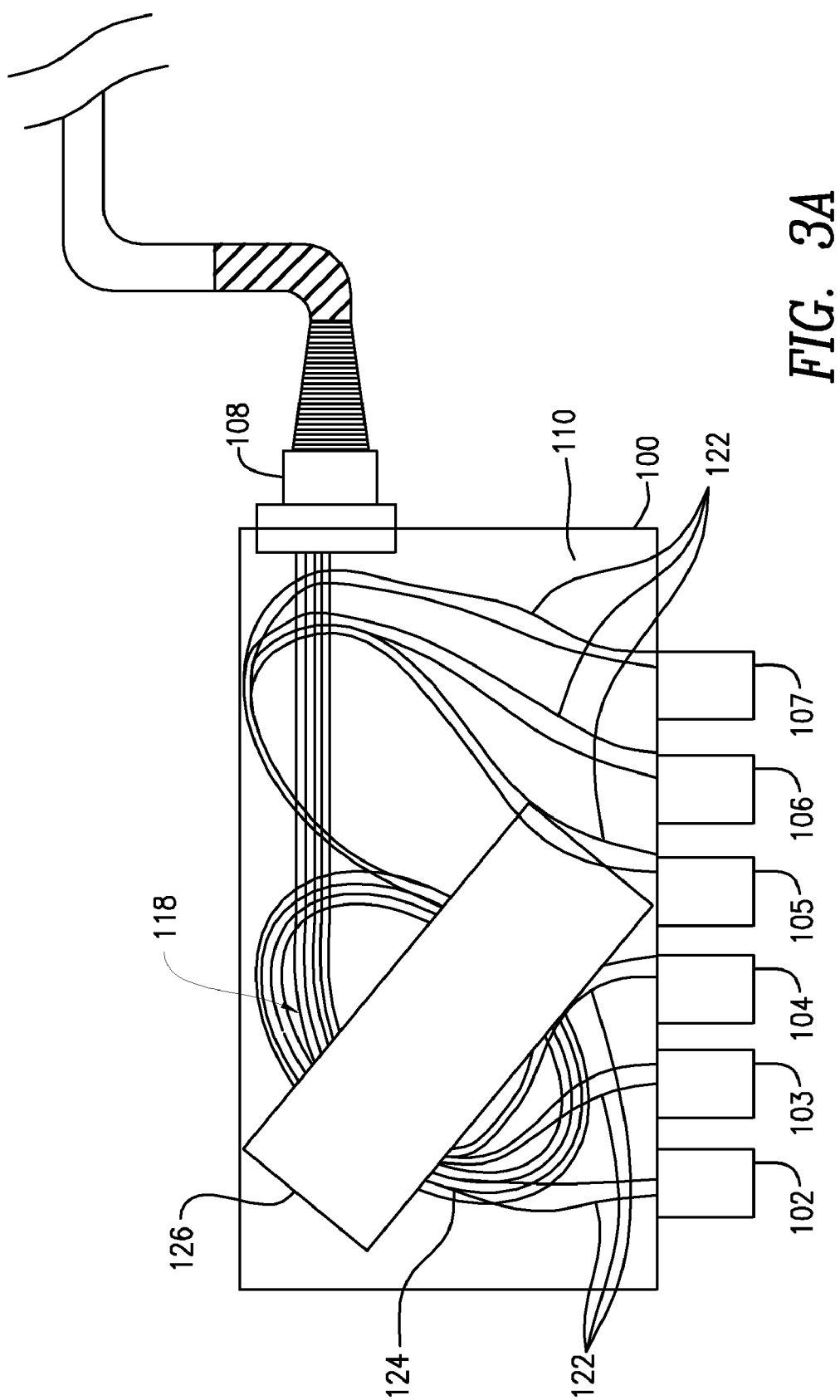
FIG. 3A is a cut-away front plan view taken along line 3-3 of the patch box of FIG. 2.
Figure 5:
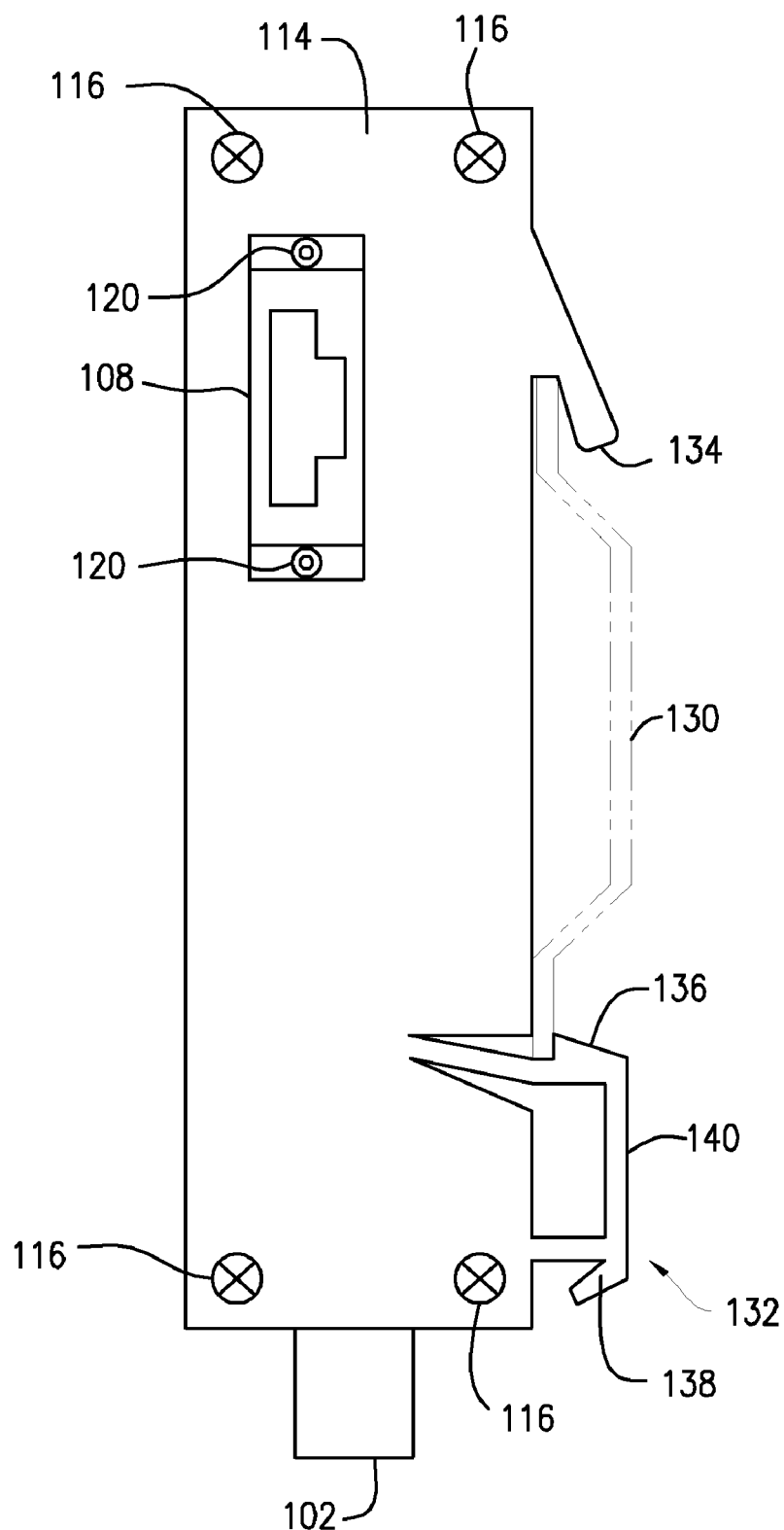
FIG. 5 is another end view of the patch box of FIG. 4A mounted on the equipment rail.

With reference to FIG. 3A, a cut-away view of the patch box 100 reveals an optical fiber assembly 118 illustrated with a configuration to support a 12 optical fiber bundle from the outgoing connector to a set of six duplex distribution connectors 102-107 such as the LC connectors discussed above. An outgoing connector 108 of the type suitable for a 12 optical fiber connection is a U.S. CONEC, MTP™-ADPT connector manufactured by U.S. CONEC of Hickory, N.C. The connector 108 is preferably mounted to an end cap 114 secured by screws or rivets 120 (FIG. 5). The fibers 122 (FIG. 3A) are for this configuration of the housing preferably wound in a coil 124 to maintain a desired bend radius between the outgoing connector 108 and the distribution connectors 102-107 such that TIR of each of the optical fibers is maintained and to minimize physical strain on the fibers. A mounting device 126 is used to secure the fibers from movement within the patch box housing 110. The mounting device 126 may include any conventional mounting means; however, the fibers are preferably secured with an adhesive tape as the mounting device 126. An adhesive tape has a width or is applied in multiple side-by-side layers that covers or substantially covers the entire diameter of the coiled fibers 124. An adhesive tape of the type suitable for this purpose is 3M™ VHB™ brand tape sold under model numbers 59xx and 49xx series by 3M of St. Paul, Minn. It will be appreciated that other mounting means such as glue, mounting brackets, foam may be used or substituted depending upon the configuration of the housing and cost to manufacture. Thus, each of the optical fibers 122 within the patch box are pre-terminated between in this instance LC and MTP™ multimode connectors. It will be appreciated by those skilled in the art that while multimode connectors are preferred, a single mode fiber connector may be used as well.

Figure 3B:
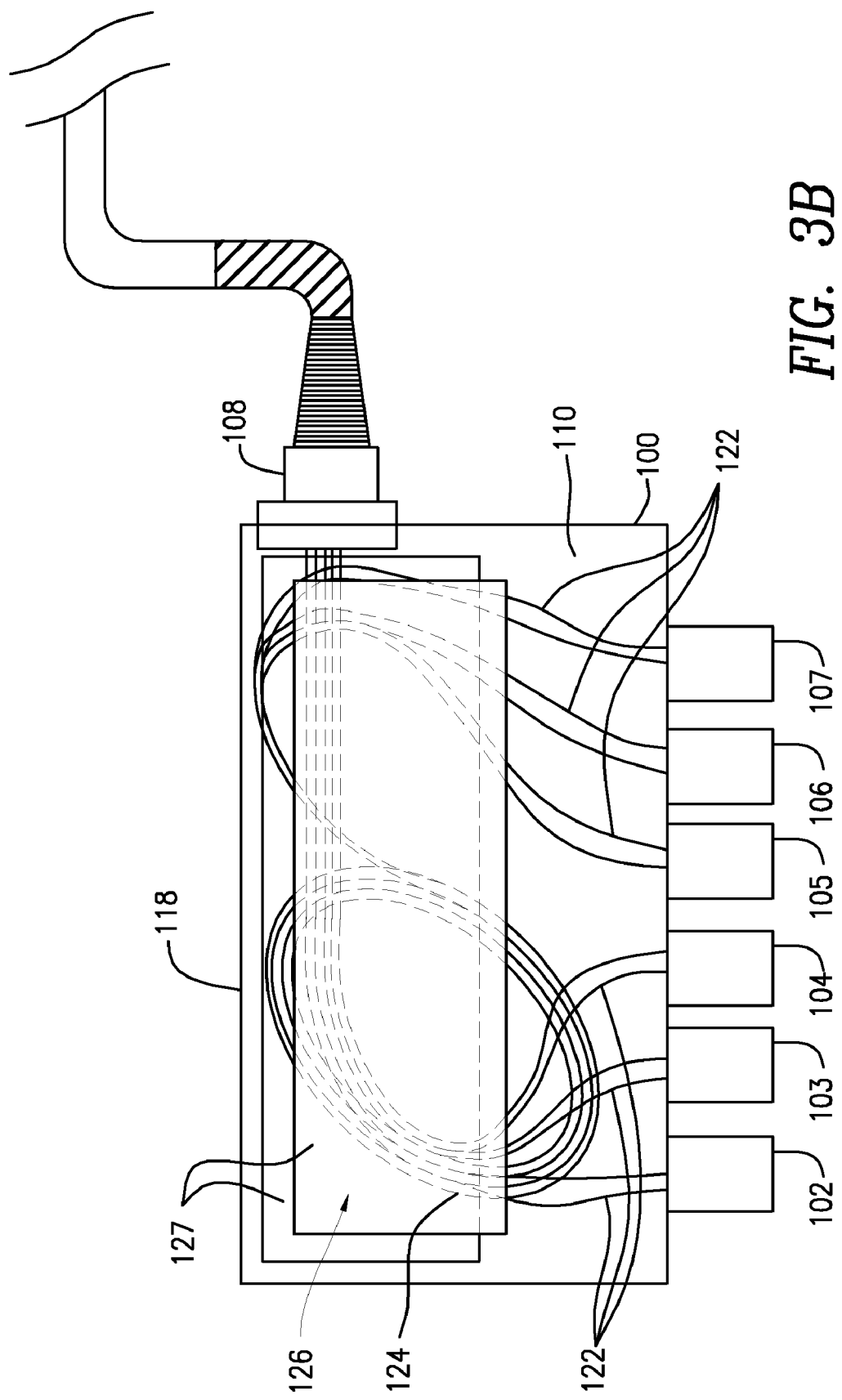
FIG. 3B is a cut-away front plan view of an alternate embodiment taken along line 3-3 of the patch box of FIG. 2.

With reference to FIG. 3B, where like reference numerals refer to like structures of FIG. 3A, an alternatively preferred mounting device 126 includes two layers 127 of insulated adhesive tape. An adhesive tape of the type suitable for this purpose is 3M™ VHB™ brand tape sold under model numbers 59xx and 49xx series by 3M of St. Paul, Minn.

Figure 4A:
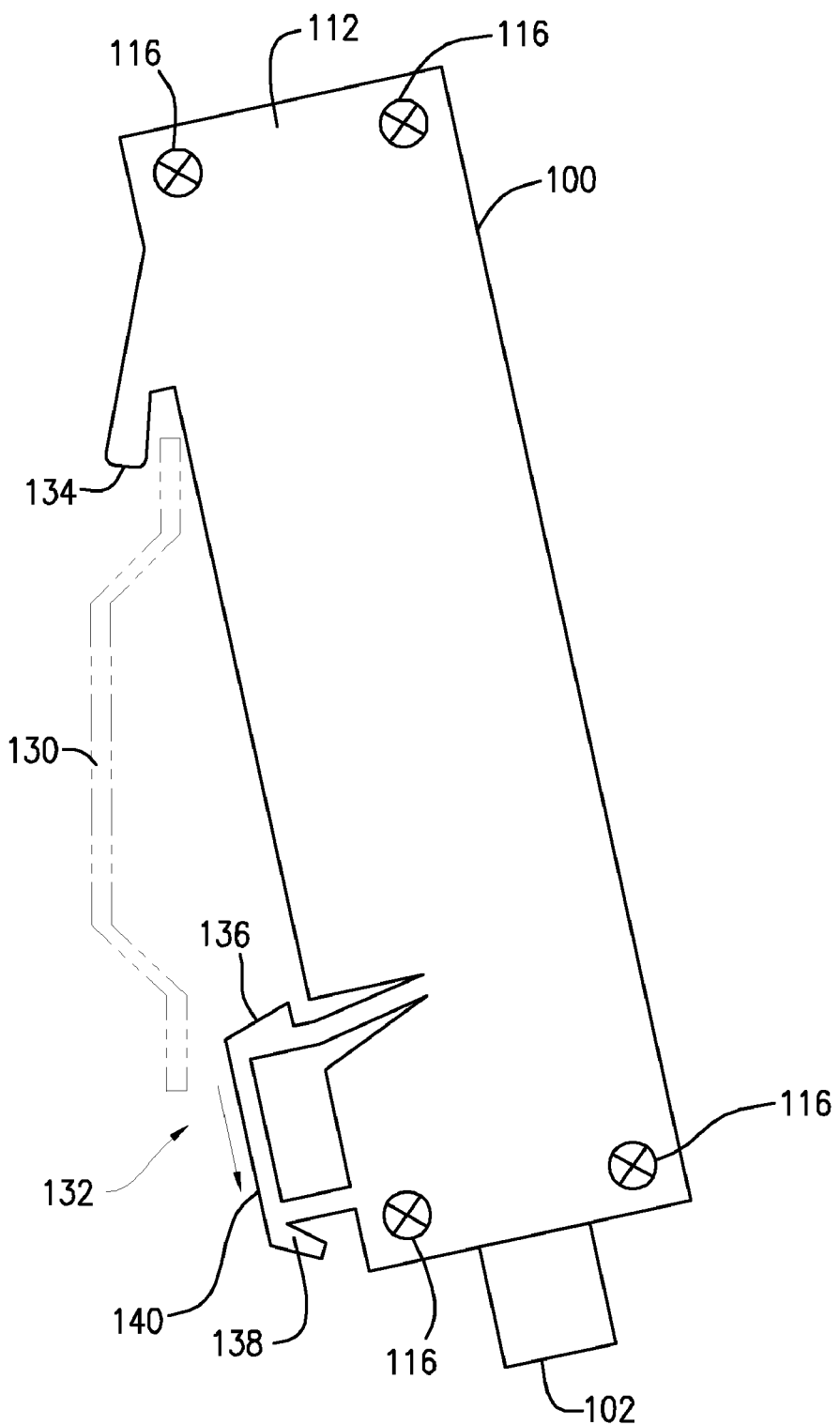
FIG. 4A is a end view of a patch box arranged for mounting on an equipment rail.
Figure 4B:
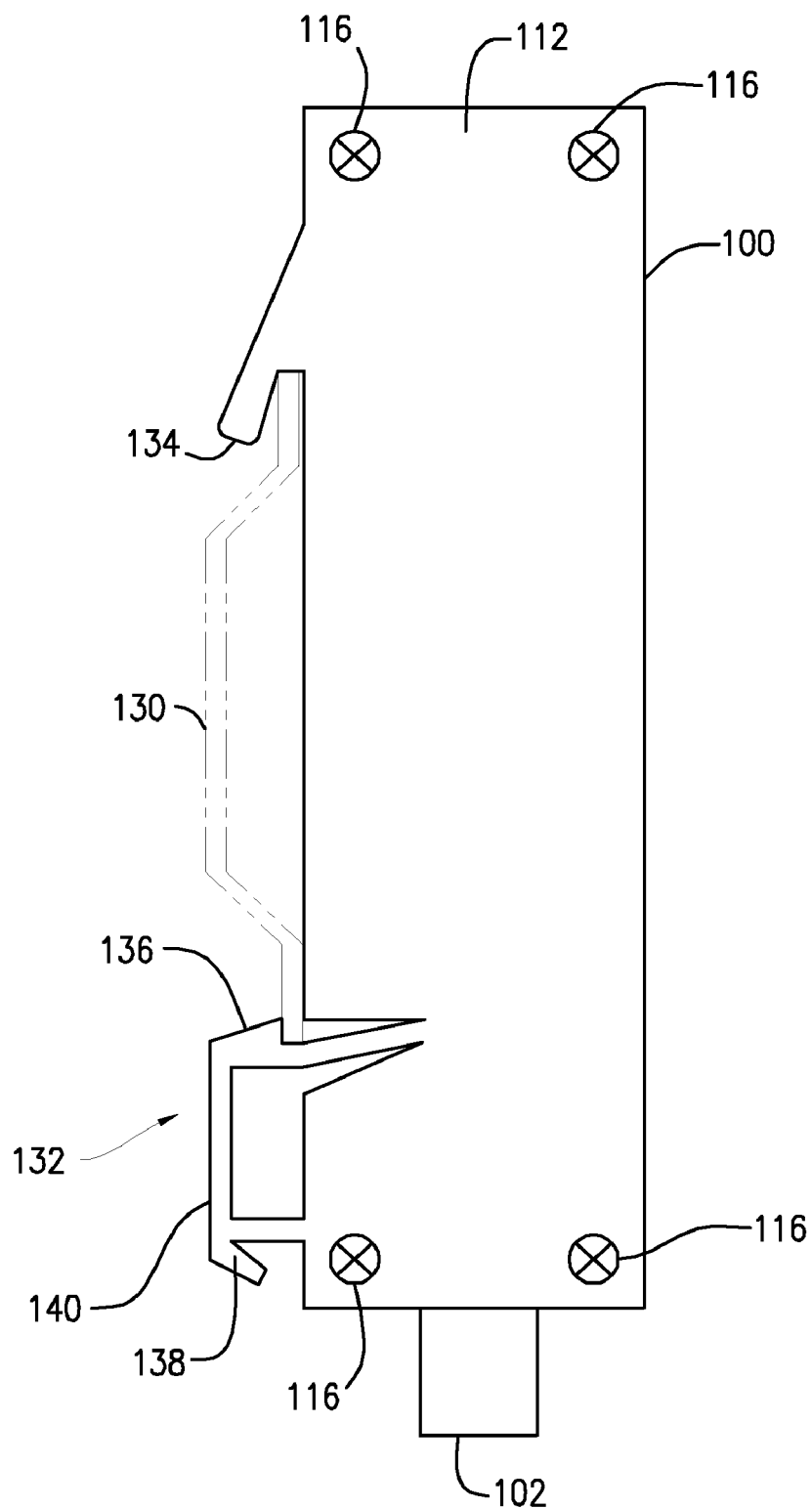
FIG. 4B is the end view of the patch box of FIG. 4A mounted on the equipment rail.

With reference to FIGS. 4A, 4B and 5 the attachment of the patch box to the mounting rail 130 of the cabinet includes in the preferred embodiment a releasable latch 132 formed by the configuration of the injection molded end caps 112 and 114. The rails 130 in the cabinet are generally referred to as DIN rails and refer to rails manufactured according to DIN (Deutsche Industrie Normen) that translates to German Industrial Standards. A DIN rail latch is formed from a fixed J-hook upper member 134 that cooperates with a moveable J-hook lower member 136. The patch box 100 is rotatably moved down on to the DIN rail 130 so that the upper J-hook member 134 rests on the rail 130. The patch box 100 is then rotated about the upper J-hook member 134 and rail 130 engagement until the lower moveable J-hook member 136 is maintained in an engaging relationship with the DIN rail 130. The lower moveable J-hook member has a release 138 that includes a resting surface 140 that can be used to help the manual release of the patch box 100 from the rail 130 by drawing the lower J-hook member 136 away from the rail 130. The surface 140 also helps stabilize the patch box 100 against rotation about the axis of the rail 130 by providing a bumper surface that can brace the patch box against the back wall of the cabinet (not shown). It should be noted that the DIN rail mounting is not necessarily limited to this latch mechanism 132 configuration. Other latch configurations may be used without departing from the spirit of a DIN rail mountable patch box. Furthermore in certain embodiments a non-releasable latch may be used.

When in use the patch box may simply be snapped onto a DIN rail and connections using conventional connectors or plugs may then be connected directly to the patch box. The releasable latch allows for the patch box to be easily moved around the cabinet as desired for different connections and configurations. The use of conventional fiber optic cables with pre-terminated plugs allows for technicians to be used to replace defective cables that do not require knowledge of optical fiber splicing.

Figure 6:
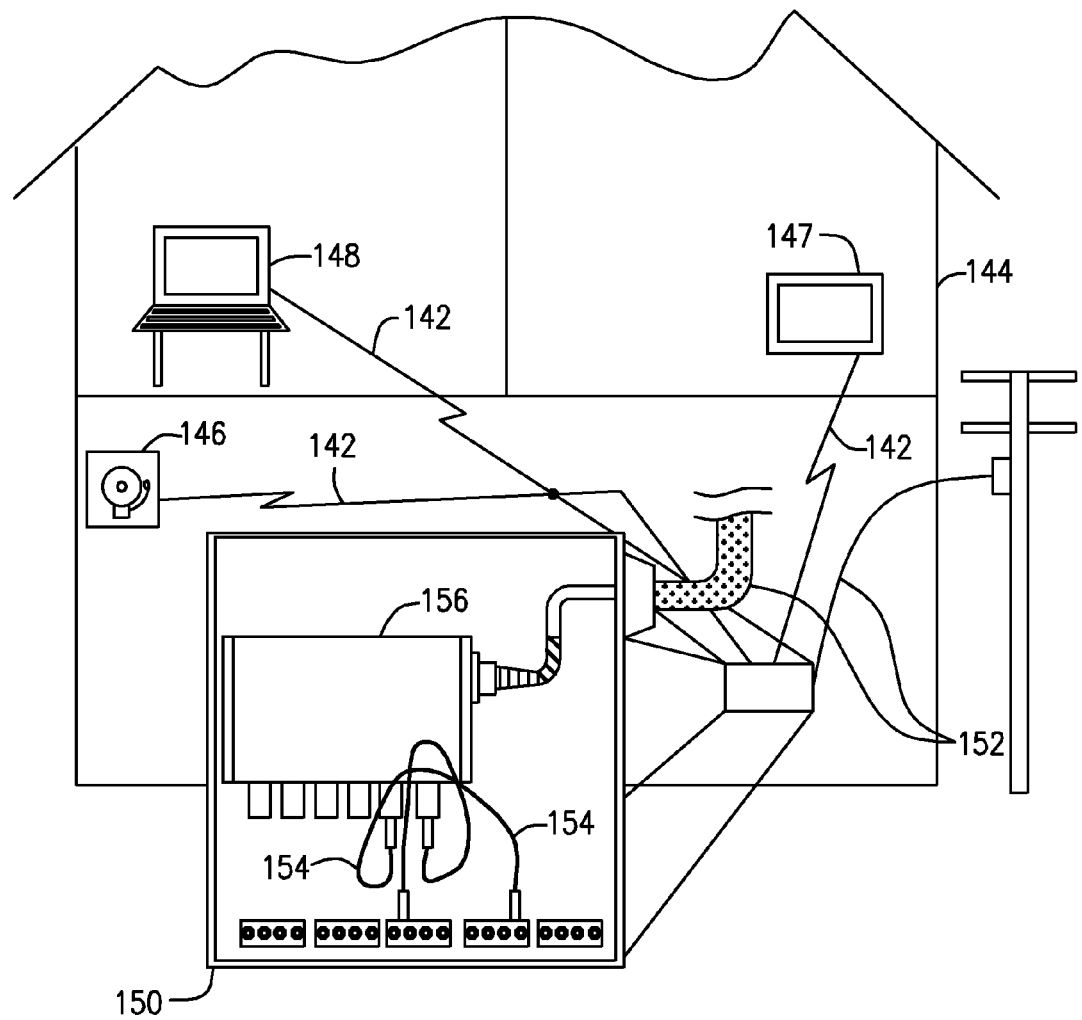
FIG. 6 is a diagrammatic view of a patch box installed in a fiber-to-the-home cabinet.

As the patch box of the present invention presents a pre-terminated patch connection for fiber optic assemblies. It should be noted that other cabinet configurations might be well suited for the patch box of the present invention. One such use may be in the application of fiber-to-the-home applications (FIG. 6) in which a cabinet that bridges between the outside fiber cable connects with fiber 142 running through the home 144 for use in security monitoring applications 146, home entertainment 147 and telecommunication 148 including high speed Internet access. A cabinet 150 similar to existing home telecommunication cabinets includes an outgoing cable 152 and optic cable leads 154 coming from the internal home fiber lines 142 that interconnect through the patch box 156 of the present invention. As the present invention reduces the skills required for making fiber optic connections, it will be appreciated that home users may be able to run their fiber connections throughout the house using a patch box of the present invention.

Figure 7:
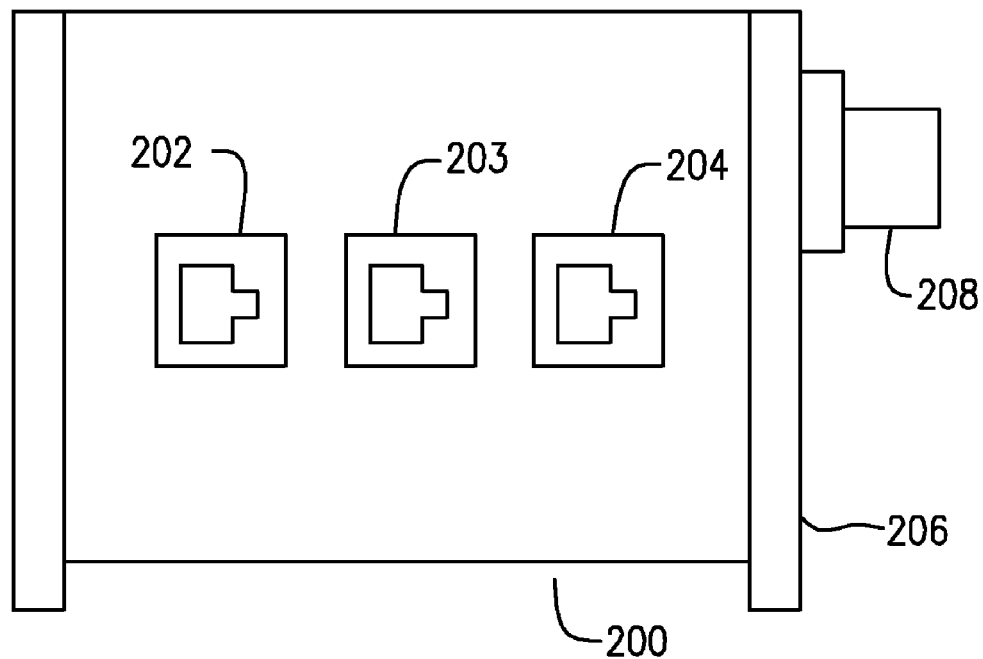
FIG. 7 is a side view of an alternate patch box according to the present invention.

With reference to FIG. 7, an alternate patch box 200 having three distribution connectors 202-204 mounted on the housing 206 with outgoing connector 208 located in spaced apart relation for easy identification exemplifies that the patch box can be connected with different numbers of connectors for different applications without departing from the spirit of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A patch box comprising:
   a housing;
   said housing includes a rail mounting latch;
   an optical fiber assembly mounted within the housing; and
   connectors mounted in the housing;
   wherein said optical fiber assembly connects between at least two of said connectors.

2. The patch box of claim 1 wherein said optical fiber assembly is in a generally dust free environment within said housing.

3. The patch box of claim 1 wherein said connectors connect to exterior fiber optic cables.

4. The patch box of claim 1 wherein at least one of said connectors is duplex.

5. The patch box of claim 1 wherein at least one of said connectors is multiplex.

6. The patch box of claim 1 wherein at least one of said connectors is an ADPT connector.

7. The patch box of claim 1 wherein at least one of said connectors is an LC connector.

8. The patch box of claim 1 wherein said optical fiber assembly is arranged in said housing to maintain TIR between said at least two connectors.

9. The patch box of claim 8 wherein said optical fiber assembly is mounted in said housing by a mounting device.

10. The patch box of claim 9 wherein said mounting device is a device of the group selected from tape, glue, brackets and foam.

11. The patch box of claim 1 wherein said rail mounting latch connects said housing to a DIN rail in a cabinet and includes a bumper for contact between said patch box and cabinet.

12. The patch box of claim 11 wherein said rail mounting latch includes a release to release said housing from said DIN rail.

13. A patch box comprising:
   a housing;
   said housing includes a DIN rail mounting latch;
   an optical fiber assembly mounted within the housing; and
   connectors mounted in the housing;
   said optical fiber assembly connects between at least two of said connectors;
   said rail mounting latch is formed integrally to said housing and includes a release and a bumper;

said optical fiber assembly is mounted in said housing by a mounting device;
said mounting device is a device of the group selected from tape, glue, brackets and foam;
said optical fiber assembly is arranged in said housing to maintain TIR between said at least two connectors; and
said optical fiber assembly is in a generally dust free environment within said housing.

14. The assembly of claim 13 wherein said connectors include one outgoing connector and at least six duplex connectors.

15. A DIN rail cabinet and patch box assembly comprising:
a cabinet housing having at least one DIN rail mounted therein;
at least one patch box including:
a housing;
said housing includes a rail mounting latch mounted to said at least one DIN rail;
an optical fiber assembly within the housing; and
connectors mounted in the housing;
wherein said optical fiber assembly connects between at least two of said connectors;
at least one outgoing fiber cable releasably connected to one of said patch box connectors; and
at least one DIN rail mountable device mounted to said at least one DIN rail and connected to another one of said patch box connectors via an optical cable to form a signal communication between said outgoing cable and said device.

16. The assembly of claim 14 wherein:
said optical fiber assembly includes a mounting device.

17. The assembly of claim 14 wherein said rail mounting latch is formed integrally to said housing.

18. The assembly of claim 14 wherein said outgoing cable includes a portion insulated for outside said cabinet and a portion insulated for the cabinet interior to promote positioning of the cable within the cabinet.

19. The assembly of claim 14 wherein said rail mounting latch includes a release.

20. The assembly of claim 14 wherein said connectors include one outgoing connector and at least three duplex connectors.

* * * * *